United States Patent [19]
Prentiss et al.

[11] Patent Number: 5,190,304
[45] Date of Patent: Mar. 2, 1993

[54] BACK SAVER HAND TRUCK

[76] Inventors: Dee Prentiss, 29 River St., Bristol, Conn. 06010; George Spector, 233 Broadway Rm. 3815,, New York, N.Y. 10007

[21] Appl. No.: 806,313

[22] Filed: Dec. 13, 1991

[51] Int. Cl.⁵ .................................................. B62B 1/20
[52] U.S. Cl. ........................... 280/47.29; 414/490; 187/9 R
[58] Field of Search ............... 280/47.18, 47.24, 47.26, 280/47.27, 47.29, DIG. 5, 47.33, 5.2, 5.3; 414/490; 335/47, 49, 54; 200/61.45 R, 61.52; 187/9 R X, 9 E, 10

[56] References Cited

U.S. PATENT DOCUMENTS

| | | | |
|---|---|---|---|
| 2,710,759 | 6/1955 | Bayer et al. | 280/47.33 |
| 2,990,190 | 6/1961 | Eriksen | 280/47.33 |
| 3,055,523 | 9/1962 | Warn | 280/5.2 |
| 3,763,965 | 10/1973 | Riekkinen | 280/47.29 |
| 3,906,415 | 9/1975 | Baker | 335/47 |
| 3,907,138 | 9/1975 | Rhodes | 414/490 |
| 4,649,240 | 3/1987 | Davis, Sr. | 200/61.52 |
| 4,728,245 | 3/1988 | Shelton | 414/490 |
| 4,737,065 | 4/1988 | Ju | 414/490 |
| 4,886,233 | 12/1990 | Bateman et al. | 280/47.33 |
| 4,981,412 | 1/1991 | Hawkins | 280/47.29 |

FOREIGN PATENT DOCUMENTS 0664146  2/1988  Switzerland ............. 414/490

Primary Examiner—Richard M. Camby

[57] ABSTRACT

A back saver hand truck is provided which consists of an elongated upstanding frame having a handle portion. A pair of ground engaging wheels are attached to the bottom of the frame. A platform is for supporting a load thereon. The platform transversely extends outwardly at one end from the frame. A mechanism for lifting said platform upwardly and lowering it downwardly in a longitudinal direction along the frame, so that a person does not have to bend down to remove the load from the platform, when the platform is lifted upwardly.

2 Claims, 1 Drawing Sheet

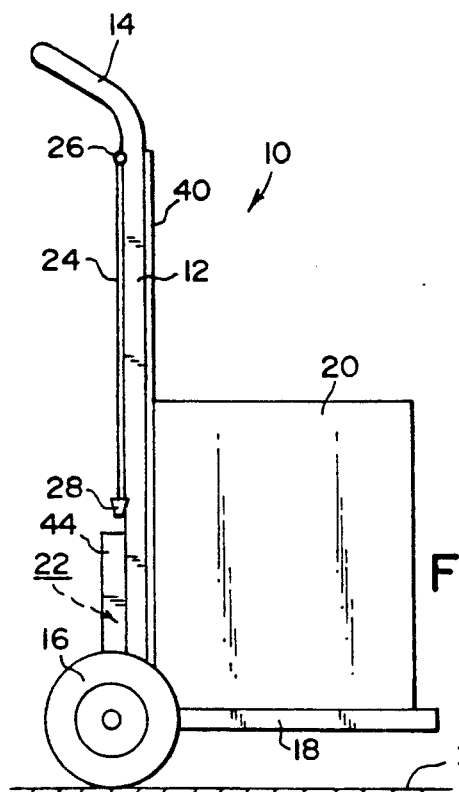
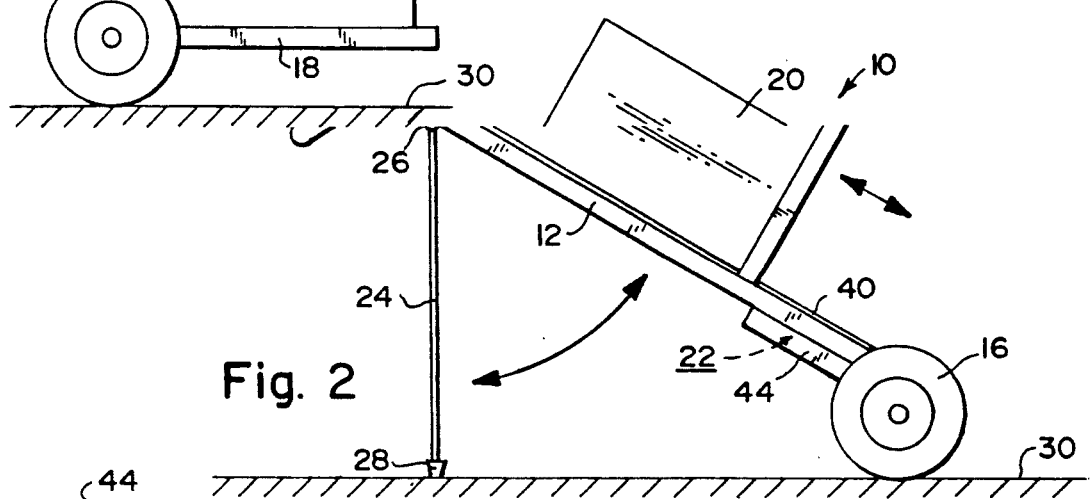
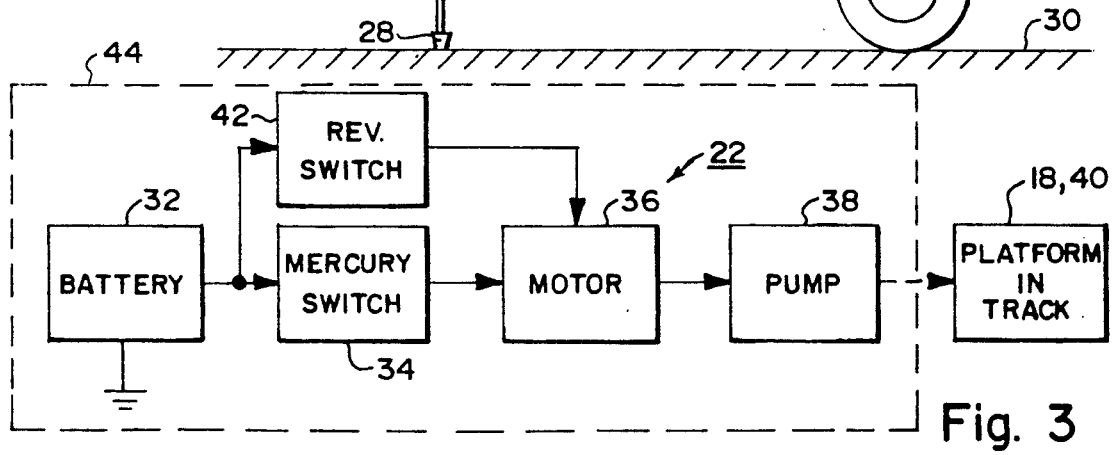

BACK SAVER HAND TRUCK

BACKGROUND OF THE INVENTION

The instant invention relates generally to barrows and more specifically it relates to a back saver hand truck which provides a lift mechanism for a load support platform, so that a person does not have to bend down to remove the load from the support platform.

There are available various conventional barrows which do not provide the novel improvements of the invention herein disclosed.

SUMMARY OF THE INVENTION

A primary object of the present invention is to provide a back saver hand truck that will overcome the shortcomings of the prior art devices.

Another object is to provide a back saver hand truck in which a lift mechanism operates a load support platform, so that the load can be raised upwardly in which a person does not have to bend down to remove the load from the support platform.

An additional object is to provide a back saver hand truck with pivotable rest legs to support the hand truck in an inclined position and in which the lift mechanism will become activated to raise the load support platform.

A further object is to provide a back saver hand truck that is simple and easy to use.

A still further object is to provide a back saver hand truck that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side elevational view of the invention in a generally vertical position.

FIG. 2 is a side elevational view of the invention in an inclined position with the lift mechanism in operation.

FIG. 3 is a block diagram of the lift mechanism within the housing.

DETAILED DESCRIPTION OF THE PREFERRED EMBODIMENTS

Turning now descriptively to the drawings, in which similar reference characters denote similar elements throughout the several views, the Figures illustrate a back saver hand truck 10, which consists of an elongated upstanding frame 12, having a handle portion 14. A pair of ground engaging wheels 16 are attached to the bottom of the frame 12. A platform 18 is for supporting a load 20 thereon. The platform 18 transversely extends outwardly at one end from the frame 12. A mechanism 22 is for lifting the platform 18 upwardly and lowering it downwardly in a longitudinal direction along the frame 12, so that a person does not have to bend down to remove the load 20 from the platform 18, when the platform 18 is lifted upwardly.

A pair of rest legs 24 are also provided, with each pivotally mounted at 26 to the back of the frame 12 near the handle portion 14 and have a rubber foot 28. When the hand truck 10 is tipped backward in an inclined position, the rest legs 24 will swing out with the feet 28 engaging the ground 30 to support the hand truck 10 in its inclined position.

The lifting and lowering mechanism 22 includes a battery 32 for supplying a power source. A normally opened mercury switch 34 is electrically connected to the battery 32. A motor 36 is electrically connected to the mercury switch 34. A pump 38 is electrically connected to the motor 36 and is mechanically connected to the platform 18. A track 40 is on the front of the frame 12 for the platform 18 to ride within. A normally opened reversing switch 42 is electrically connected between the battery 32 and the motor 36. When the hand truck 10 is placed in its inclined position the mercury switch 34 will close causing the motor 36 to activate the pump 38 and lift the platform 18 upwardly. The reversing switch 42 can then be manually closed for reversing the motor 36, changing the direction of the pump 38 and lowering the platform 18 downwardly to its original position.

The back saver hand truck 10 further includes a housing 44 mounted to the back of the frame 12 below the rest legs 24. The housing 44 is sized to hold the battery 32, the mercury switch 34, the motor 36, the pump 38 and the reversing switch 42 therein.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A back saver hand truck which comprises:
   a) an elongated upstanding frame having a handle portion;
   b) a pair of ground engaging wheels attached to the bottom of said frame;
   c) a platform for supporting a load thereon, said platform transversely extending outwardly at one end from said frame;
   d) means for lifting said platform upwardly and lowering said platform downwardly in a longitudinal direction along said frame so that a person does not have to bend down to remove the load from said platform, when said platform is lifted upwardly; further including a pair of rest legs, each pivotally mounted to the back of said frame near said handle portion and having a rubber foot, so that when said hand truck is tipped backward in an inclined position, said rest legs will swing out with said feet engaging the ground to support said hand truck in its inclined position; wherein said means for lifting said platform upwardly and lowering said platform downwardly is mounted to said frame and includes:
   e) a battery for supplying a power source;
   f) a normally opened mercury switch electrically connected to said battery;
   g) a motor electrically connected to said mercury switch;
   h) a pump electrically connected to said motor and mechanically connected to said platform;
   i) a track on the front of said frame for said platform to ride within; and j) a normally opened reversing switch electrically connected between said battery and said motor, so that when said hand truck is placed in its inclined position, said mercury switch will close causing said motor to activate said pump and lift said platform upwardly, said reversing switch can then be manually closed for reversing said motor, changing the direction of said pump and lowering said platform downwardly to its original position.

2. A back saver hand truck as recited in claim 1, further including a housing mounted to the back of said frame below said rest legs, whereby said housing is sized to hold said battery, said mercury switch, said motor, said pump and said reversing switch therein.

* * * * *